H. J. DERY.
NUT LOCK.
APPLICATION FILED DEC. 6, 1917.
1,299,691.
Patented Apr. 8, 1919.
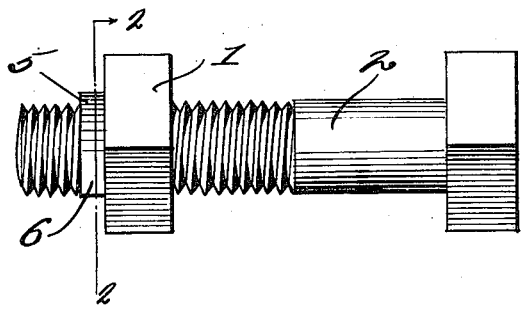
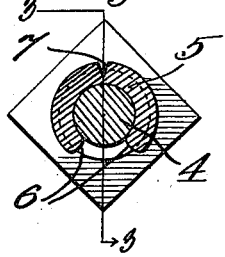 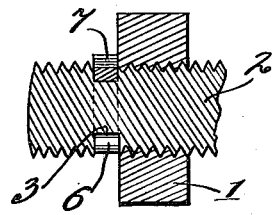
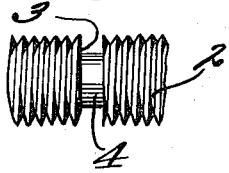
INVENTOR
*Henry J. Dery*
WITNESSES
BY
ATTORNEY

UNITED STATES PATENT OFFICE.

HENRY J. DERY, OF DETROIT, MICHIGAN.

NUT-LOCK.

1,299,691.  Specification of Letters Patent.  Patented Apr. 8, 1919.

Application filed December 6, 1917. Serial No. 205,839.

*To all whom it may concern:*

Be it known that I, HENRY J. DERY, a citizen of the United States, residing at Detroit, in the county of Wayne and State of Michigan, have invented certain new and useful Improvements in Nut-Locks, of which the following is a specification.

My invention relates to new and useful improvements in nut locks, and an important object of the invention is to provide a device including a washer of a resilient character having a groove therein, its ends spaced apart to facilitate the same to pass into a recess in a bolt for locking a nut thereon against rotation when the nut engages the washer.

Another object of my invention is to provide a device of the above mentioned character which is of such simple construction that the recess in the bolt, comprising part of the invention may be provided during the threading of the bolt on a lathe, and the other part of the invention, consisting of a split washer may be formed by a single stamping operation, thereby providing a device which is strong, durable, inexpensive to manufacture, and efficient in practice.

Other objects and advantages of my invention will be apparent during the course of the following description.

In the accompanying drawings forming a part of the description, and wherein like numerals are employed to designate like parts throughout the same, Figure 1 is a side elevation of my invention applied to a nut and bolt.

Fig. 2 is a sectional view taken on the line 2—2 of Fig. 1.

Fig. 3 is a longitudinal vertical sectional view taken on the line 3—3 of Fig. 2, and, Fig. 4 is a side elevation of the threaded portion of the bolt having an annular recess therein.

In the drawings, wherein is shown a preferred embodiment of my invention, the numeral 1 designates the usual nut of any desired shape which is adapted to be received on the threaded portion of the usual bolt 2. As more clearly shown in Fig. 4, the threaded portion of the bolt is provided with an annular recess 3, which is of such depth to provide a reduced portion or shank 4 introduced between two sections of the threads.

My improved washer 5 is preferably made of spring steel, which is adapted to be received in the recess 3, is of ring like construction, which has a transverse slot communicating with the central opening of the ring to form free ends 6 which are spaced a substantial distance apart to facilitate these ends being passed over the shank 4 in order that the washer 5 may be properly seated in the annular groove 3. The slot is of slightly less width than the diameter of the reduced portion or shank 4 of the bolt. When in a locked position, the inner periphery of the washer 5 is adapted to snugly engage the shank 4. In the outer periphery or edge of the washer 5 at a point opposite to the free ends 6, I either split the ring transversely a slight distance inward, or form a transverse groove 7 therein. By means of this groove 7, and the resilient characteristic of the washer, the free ends 6 may be spread apart to enable the washer to seat in the recess 3.

Since the nut lock is adapted to be used principally in connection with joining sections of a rail together, the exact location of the nut 1 can be readily determined, by making tests or determining the location of the nut in its locked position upon the bolt. The annular recess 3 can then be provided in all bolts used for this purpose, so that the washer 5 will abut with the top of the nut when the washer is applied to the recess in the bolt. It will, therefore, be readily seen that the position of the recess 3 in the threaded portion of the bolt, varies according to the class of work to which the bolt and nut is assigned.

After the bolt 2 has been passed through its work, the nut 1 is rotated upon the threaded portion of the bolt until the same reaches its clamping engagement with the work. At this position the top of the nut, or the outside thereof, will be arranged adjacent the inner edge of the annular recess 3. The washer 5 is then placed so that the free ends thereof engage the reduction or shank 4, and is then forced downwardly so that the free ends of the washer spread and allow the washer to be snugly engaged around the shank 4. By providing the transverse groove 7 in the washer opposite to the free ends thereof, it will be seen that the free ends 6 will be readily permitted to separate without deforming the washer in any way.

When the washer is placed upon the bolt as stated before, it will be seen that the nut 1 will be snugly held against rotation.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having described my invention, I claim:

In combination with a nut and bolt, said bolt having an annular recess in its threaded portion to provide a reduced portion or shank, a ring like washer of resilient material having a transverse slot therein communicating with the central opening of the ring to space the free ends of the washer, said slot being of slightly less width than the diameter of the reduced portion or shank of the bolt, and said washer having a transverse V shaped groove in its outer periphery opposite a point equidistant between the free ends of the washer to permit the ends of the washer formed by the slot to spread, whereby said ends may spread to pass over the reduced portion or shank of the bolt and assume their normal positions so that the washer may frictionally engage said reduced portion to prevent the outward movement of the nut.

In testimony whereof I affix my signature in presence of two witnesses.

HENRY J. DERY.

Witnesses:
JOSEPH E. NACLEAR,
SELFRED T. DAUPHINAIS.